United States Patent
Beardsley et al.

(10) Patent No.: US 7,355,583 B2
(45) Date of Patent: Apr. 8, 2008

(54) MOTION-BASED TEXT INPUT

(75) Inventors: Paul A. Beardsley, Boston, MA (US); Jeroen van Baar, Brookline, MA (US)

(73) Assignee: Mitsubishi Electric Research Laboretories, Inc., Cambridge, MA (US)

( * ) Notice: Subject to any disclaimer, the term of this patent is extended or adjusted under 35 U.S.C. 154(b) by 716 days.

(21) Appl. No.: 10/915,223

(22) Filed: Aug. 10, 2004

(65) Prior Publication Data

US 2006/0033702 A1    Feb. 16, 2006

(51) Int. Cl.
*G09G 5/00*    (2006.01)
(52) U.S. Cl. ..................................... 345/156
(58) Field of Classification Search ........ 345/156–157, 345/168, 169, 419; 341/22; 348/744, 43; 353/42, 30, 69; 356/602; 715/773, 727, 715/729; 382/154; 349/6
See application file for complete search history.

(56) References Cited

U.S. PATENT DOCUMENTS

| 6,764,185 | B1 | 7/2004 | Beardsley et al. | 353/122 |
| 6,977,643 | B2 * | 12/2005 | Wilbrink et al. | 345/156 |
| 7,113,151 | B2 * | 9/2006 | Kinebuchi | 345/8 |
| 7,151,533 | B2 * | 12/2006 | Van Ieperen | 345/173 |
| 2003/0165048 | A1 * | 9/2003 | Bamji et al. | 361/681 |

* cited by examiner

*Primary Examiner*—Richard Hjerpe
*Assistant Examiner*—Abbas Abdulselam
(74) *Attorney, Agent, or Firm*—Dirk Brinkman; Clifton D. Mueller; Gene V. Vinokur

(57) ABSTRACT

A method generates input text with a pointing device at a distance from a writing surface. Motion information of a mobile coordinate frame of the pointing device is sensed relative to a stationary coordinate frame of the writing surface using a motion sensor configured to track motion of the pointing device. The input text is then determined from the motion information. A projection of a track of the motion of the pointing device on the writing surface can also be determined from the motion information, and the track can be displayed on the writing surface as the input text.

25 Claims, 3 Drawing Sheets

MOTION-BASED TEXT INPUT

FIELDS OF THE INVENTION

This invention relates to pointers, and more particularly to pointers used for text input.

BACKGROUND OF THE INVENTION

A pointer can be used for providing visual feedback. A very simple example of a hand-held pointer is a laser pointer. That device allows a user to display a movable point on a surface. However, it is difficult to display a track formed by the moving point, such as a square, on the display surface, when the laser pointer is hand-held. In the prior art, one way that a track can be displayed is to augment the laser pointer with a fixed camera, and to observe the moving point on display surface with the camera to recover the track of the laser point. Then, a fixed projector can be used to display a view of the recovered track. Thus, the hand-held laser pointer must be augmented with a fixed camera and a fixed projector, which greatly reduces the portability of the system.

U.S. Pat. No. 6,764,185, "Projector as an Input and Output Device," issued to Beardsley, et al. on Jul. 20, 2004, describes an interactive display system including a sensor for sensing a relationship between a mobile coordinate frame fixed to a moving, hand-held projector, and a stable coordinate frame fixed to a stationary display surface in the real world. The mobile coordinate frame can be used within the stable coordinate frame to provide an visual user interface for interacting, e.g., with a conventional windows-style computing environment, with the display surface. Some examples of user interaction are 'pressing' on displayed buttons, dragging displayed sliders, or a mouse-type selection of a region of interest in the display. The hand-held projector can also display a stable visible track as the user moves the projector.

FIG. 1 shows operations of the hand-held pointing projector described by Beardsley, et al. A portable projector 100 is equipped with a motion sensor 110 to determine a pose of the moving projector relative to a stationary display surface 120. Hereinafter, the 'pose' is the 3D position and 3D orientation of the projector. Because the projector 100 can move along a track 101, output images 102 may appear on the display surface as irregular quadrilaterals. The motion sensor 110 can be a camera, tilt sensors, or accelerometers.

The projector 100, using the motion sensor 110, projects output images 102. Four types of images are defined, the output image 102, a black image portion 103, a stable image portion 104, and a mobile image portion 105, e.g. a cursor, partitioned from the output images 102. Pixels of the black portion are mutually exclusive from the stable portion, and pixels of the mobile portion are within the boundary of the stable portion.

The output images 102 include all pixels for all source data stored in a projector image or frame buffer. The pixels of the output image move on the display surface according to the moving coordinate frame of the projector, as is conventional. For example, the output image can include a small red 'dot' 106 that looks like a laser dot.

Some of the output pixels can be set to 'black', i.e., a zero pixel intensity value to make the black image portion 103, which is shown stippled in FIG. 1. These 'invisible' pixels also move according to the coordinate frame of the projector.

The pixels of the stable image portion 104 are fixed to the stationary coordinate frame of the real-world. The location of those pixels within the output image 102 is determined using the motion sensor 110. Thus, as the projector moves 101 to different poses, the stable image 104 appears at a fixed location on the display surface 120.

The pixels of the mobile image portion 105 move 107 according to the mobile coordinate frame of the projector. For example, these pixels 105 can appear as an arrow 105, cursor, 'laser' dot 106, or some other icon, so that as the projector is moved left to right, it appears that the arrow also moves in the same manner, within the stable image portion. Up and down motion of the projector is mimicked in a like manner, so that the projector effectively behaves as a laser type or mouse type pointer. Buttons 111 on the projector can be used to 'click' on displayed items.

An important part of many user interfaces is entering text that can be stored in a memory or manipulated by a user or computer program, e.g., data entry and word processing. The prior art describes many ways to enter text, from pressing buttons on a keyboard, to cursive script recognizers or uni-stroke recognizers such as those used in personal digital assistants (PDA). There, characters are generated by moving a stylus on a touch sensitive surface of the display surface of the PDA. However, configuring a hand-held projector with either a touch sensitive surface or a keyboard is awkward to use and expensive.

Therefore, it is desired to provide a method and system for generating input text using a hand-held pointer that does not require additional hardware that a user must manipulate, such as a stylus or keyboard, and that does not require direct contact with the display surface. That is, the pointer is 'at a distance' from the display surface.

SUMMARY OF THE INVENTION

A method generates input text with a pointing device at a distance from a writing surface. Motion information of a mobile coordinate frame of the pointing device is sensed relative to a stationary coordinate frame of the writing surface using a motion sensor configured to track motion of the pointing device.

The input text is then determined from the motion information. A projection of a track of the motion of the pointing device on the writing surface can also be determined from the motion information, and the track can be displayed on the writing surface as the input text.

DETAILED DESCRIPTION OF THE PREFERRED EMBODIMENT

Pointer Structure

Figure 1:
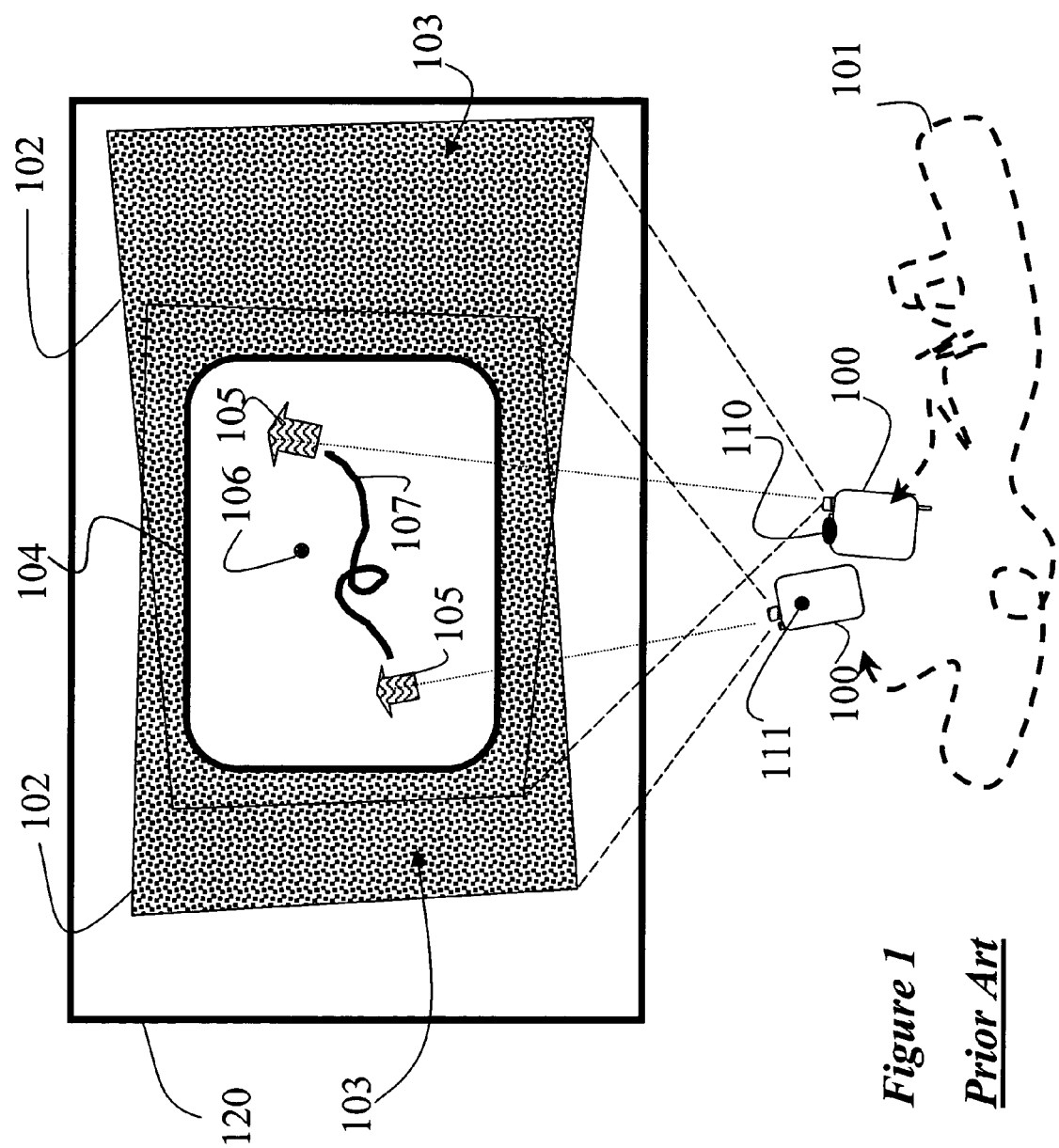
FIG. 1 is a block diagram of prior art hand-held projector.
Figure 2:
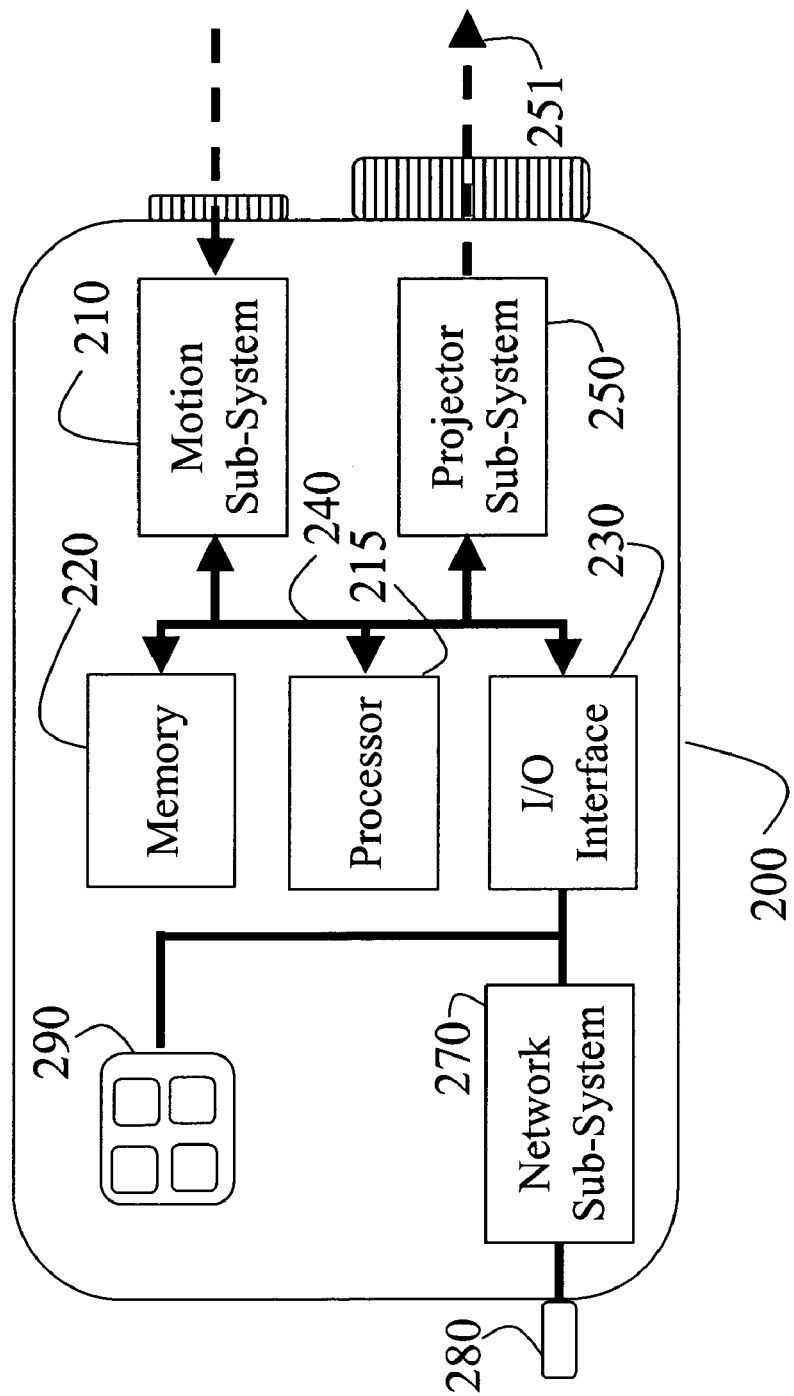
FIG. 2 is a block diagram of a pointer according to the invention.

FIG. 2 shows a pointer 200 according to the invention. The pointer is equipped with a motion sensor sub-system 210, and other components, including a microprocessor 215, a memory 220, and an I/O interface 230 connected by buses 240, functioning generally as a processing unit. The processing unit is conventional in its electronic structure, but unconventional in its operation when performing the method steps described herein. The pointer also includes a projector sub-system 250 for displaying output images 251. A network sub-system 270 allows the projector to communicate with other similar devices, or other computing devices and memories, local or remote. Therefore, the network sub-system can be connected to an antenna or infrared transceiver 280, depending on the communications medium.

A user interface 290 can provide input and output data to facilitate operation of the projector. The user interface can include exterior buttons 111. See U.S. Pat. No. 6,764,185, "Projector as an Input and Output Device," issued to Beardsley, et al. on Jul. 20, 2004, incorporated herein by reference. The motion sensor 110 determines a pose of the projector, and can be a camera, tilt sensor, or accelerometers. For further detail, see U.S. patent application Ser. No. 10/394,314, "Geometrically Aware Projector" filed Mar. 19, 2003, by Beardsley, et al., incorporated herein by reference.

Pointer Operation

A user employs the hand-held pointer 200 to move a dot or cursor, on a writing surface, for example, a projector screen, a wall, or ceiling. Alternatively, the writing surface can be a CRT or LCD display screen, either local or remote from the pointer.

It should be noted that the pointer is at a distance from the writing surface, and not in contact with surface as in most prior art text input and writing systems. By the phrase 'at a distance,' we specifically mean that the distance between the pointer and the writing surface is greater than zero. For example, the distance is one meter or greater. A track of the dot is recorded and is visually presented on the writing surface. The projected track appears fixed, at its correct position on the writing surface, even though the hand-held projector is moving.

With the pointer 200 according to the invention, the user can form individual or script characters, while presenting a visual indication of the formed characters. That is only suitable for display purposes. The method according to the invention also generates input text from motion information that defines the track. By input text, we specifically mean characters or glyphs such as letters, numbers, and punctuation marks in an alphabet of any predefined language in the form of data. For example, each character of the input text is represented by one eight-bit byte.

Figure 3:
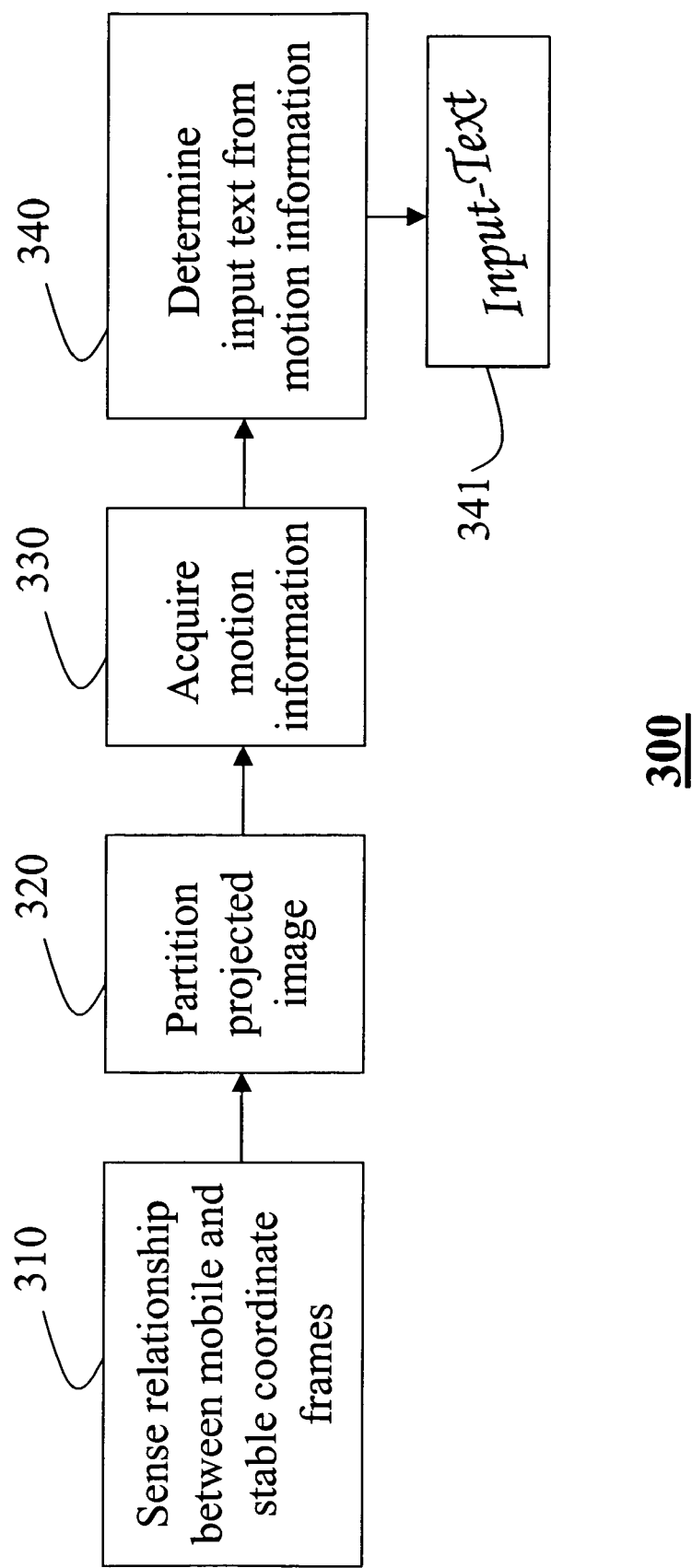
FIG. 3 is a flow diagram of method for operating the pointer of FIG. 2.

FIG. 3 shows a method 300 for generating the input text using the pointer 200 according to the invention. The pointer senses 310 a relative motion between a mobile coordinate frame of the pointer 200, i.e., the projector or a laser pointer, and a stationary coordinate frame of the environment in which the pointer operates, i.e., the real-world coordinate frame of the writing surface.

A projected output image is partitioned 320 into a black image portion having a fixed relationship to the mobile coordinate frame, a stable image portion within the black image portion having a fixed relationship to the stationary coordinate frame, and a cursor within the stable image portion having a fixed relationship to the mobile coordinate frame. The cursor can be any type of displayed icon, e.g., a small dot.

The user moves the cursor by moving the pointer within the stable image portion to form input text 341, i.e., the user 'writes' one or more character on the writing surface with the projected dot. The user can indicate when a character or script text inputs begins and ends, e.g., by pressing the button 111 on the hand-held pointer. It should be understood that while text input is described in terms of individual characters, text could also be input in multiple characters, e.g., complete words or sentences. The sensor 210 acquires 330 motion information representing an input character while moving the pointer relative to the writing surface. The motion information is used to determine 340 the input text 341.

The acquired motion can be explicit locations and orientations, i.e., poses, of the projector with respect to the writing surface at consecutive instances in time, while the user is forming the input text.

The motion information can also be a projective representation. An example of a projective representation is a sequence of homographies, one at each consecutive time instant, to determine the motion between the pointer and the writing surface, as the pointer is moved to form the input text.

The motion information can be represented as a 2D track on the writing surface. The track can be a sequence of 2D points on the writing surface. Another implementation can include both position and velocity of the cursor in the stable image portion at consecutive points in time as the user forms the input text. It should be noted, that the track can be displayed on a local or remote writing surface. However, note that it is the acquiring of the input of the text based on the motion information that is the basic effect of the invention. Therefore, it is possible that the user can 'write' in cursive script, while the displayed input text can be in any font, type-face, size or color. The input text can be stored in a memory or transmitted to some other device.

The track can be input to any number of known cursive script recognizers, or to uni-stroke recognizers for text entry such as Graffiti software of Palm, Inc., Santa Clara, Calif. In a typical hand-held device, such as a PDA, the input for a cursive script recognizer or a uni-stroke recognizer is obtained by moving a stylus in direct physical contact with the writing surface of the device. The character recognition can be based simply on the 2D path of the stylus when forming the character, or the recognition can take account of position and acceleration of the pen on the writing surface.

According to the invention, the writing instrument, i.e., the projector is at a distance from the physical writing surface, so characters are not formed in the prior art way by pressing a stylus directly on a planar writing surface.

This is an advantage of the invention because the 3D relationship of the moving projector to the stable image portion can be utilized to modify text entry. For example, a special character like a period can be input by holding down a click-button on the hand-held projector to indicate the start of character entry, moving the projector forward, towards the projected stable image portion and then backwards to its start position, then releasing the button. Thus, characters can be formed in 3D.

A second advantage of the invention is that the 3D location of the projector with respect to the writing surface can be used to indicate different modes of text entry, while still projecting to the same part of the physical writing surface. This can be done by partitioning the area in front of the writing surface into multiple regions. For example, standing in a region to the left of the writing surface and entering text leads to a different mode of operation then to standing in a region to the right of the physical writing surface and entering text, even though the projection is on the same part of the physical writing surface. There is no analogy to this in prior art pen-based text entry systems.

A third advantage of the invention is that the text entry is performed by direct projection on the physical writing surface. This can be useful when the text is an annotation that is specific to the location. For example, the user can form a message at a specific place on a door. The message, as well as the location where the message was formed is stored. Subsequently, pointing the hand-held projector at the door retrieves the text and shows it at the same location where the text was first entered. Thus, the manner that the input text is processed is based on a characteristic of the writing surface. For example, if the motion sensor is a camera, then the input text can be further processed according to a color of the writing surface.

As a fourth advantage, the writing surface does not need to be planar as in the prior art. Conventional calibration techniques can be used to determine homographies between the writing surface and the projector. These homographies can be used to warp the output images appropriately.

As a fifth advantage, the writing surface can be located anywhere. Thus, the 'writer' can write a message at one location, which becomes readable at another location by transmitting the input text to a remote writing surface. This 'air writing' would be difficult to discern by observing the 'writer', if security of the input text is of a concern, but the writing would be clearly visible to some one else near the writing surface. It should be noted that the input text can be stored as data in a memory for later retrieval. Thus, the user can write messages as reminders, the messages can be stored in the memory of the pointer, and retrieved later from the memory.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating input text with a pointing device, in which the pointing device is at a distance from a writing surface, comprising:
   sensing motion information of a mobile coordinate frame of a pointing device relative to a stationary coordinate frame of a writing surface at a distance from the pointing device using a motion sensor fixed to the pointing device and configured to track motion of the pointing device;
   defining a track of the pointing device from the motion information;
   inputting the track into a script recognizer, in which the script recognizer determines input text corresponding to the motion information.

2. The method of claim 1, further comprising:
   determining a projection of a track of the motion of the pointing device on the writing surface from the motion information; and
   displaying the track on the writing surface.

3. The method of claim 2, in which the input text is determined by recognizing a shape of the track.

4. The method of claim 2, in which processing of the input text depends on a location of the displayed input text on the writing surface.

5. The method of claim 2, in which processing of the input text depends on characteristics of the writing surface.

6. The method of claim 2, in which the input text is displayed on the writing surface according to a selected font.

7. The method of claim 1, further comprising:
   displaying the input text on the writing surface.

8. The method of claim 1, further comprising:
   storing the input text in a memory.

9. The method of claim 8, further comprising:
   storing a location of the pointing device relative to the writing surface; and
   associating the location with the stored input text.

10. The method of claim 1, further comprising:
    transmitting the input text.

11. The method of claim 1, in which the pointing device includes a projector, and further comprising:
    displaying the input text on the writing surface using the projector.

12. The method of claim 11, in which a direction of pointing the pointing device is defined by a particular pixel on an image plane of the projector.

13. The method of claim 1, in which the pointer includes an on-off button, and in which the determining is done only during a period of time when the on-off button is on.

14. The method of claim 1, in which the determining of the input text is modified according to a 3D position of the pointing device relative to the writing surface.

15. The method of claim 14, further comprising:
    partitioning an area in front of the writing surface into multiple regions; and
    modifying the determining of the input text according to a particular region occupied by the pointing device.

16. The method of claim 1, further comprising:
    modifying the determining of the input text according to forward or backward motion of the pointing device relative to the writing surface.

17. The method of claim 1, in which the pointing device includes a camera, and further comprising:
    sensing the motion information using the camera.

18. The method of claim 17, in which the input text is determined according to a color of the writing surface as sensed by the camera.

19. The method of claim 1, in which the input text is determined using a cursive script recognizer.

20. The method of claim 1, in which the input text is determined using a uni-stroke alphabet recognizer.

21. The method of claim 1, further comprising:
    sensing the motion information of a plurality of mobile coordinate frames of a plurality of pointing devices relative to the stationary coordinate frame of the writing surface at the distance from the plurality of pointing devices, each of the plurality of pointing device including a particular motion sensor; and
    determining input text from the motion information of each of the plurality of pointing devices.

22. The method of claim 21, further comprising: displaying the input text of each of the plurality of pointing devices the writing surface.

23. The method of claim 1, in which the distance is one meter or greater.

24. An apparatus for generating input text, comprising:
    a pointing device including a motion sensor;
    means for sensing motion information of a mobile coordinate frame of the pointing device relative to a stationary coordinate frame of a writing surface at a distance from the pointing device using the motion sensor;
    means for defining a track of the pointing device from the motion information; and
    a script recognizer configured to determine input text corresponding to the motion information.

25. The apparatus of claim 24, in which the pointing device further comprises:
    a projector configured to display the input text on the writing surface.

* * * * *